(12) United States Patent
Huang

(10) Patent No.: US 8,292,472 B2
(45) Date of Patent: Oct. 23, 2012

(54) LIGHT-EMITTING DEVICE AND LIGHT-GUIDING MEMBER THEREOF

(75) Inventor: Ming-Chieh Huang, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 355 days.

(21) Appl. No.: 12/703,145

(22) Filed: Feb. 9, 2010

(65) Prior Publication Data

US 2010/0208456 A1  Aug. 19, 2010

(30) Foreign Application Priority Data

Feb. 13, 2009 (TW) ................ 98104660 A

(51) Int. Cl.
*F21V 5/00* (2006.01)
*F21V 13/04* (2006.01)

(52) U.S. Cl. .................... 362/327; 362/555

(58) Field of Classification Search .......... 362/327, 362/555

See application file for complete search history.

(56) References Cited

U.S. PATENT DOCUMENTS

| | | | |
|---|---|---|---|
| 3,774,021 A * | 11/1973 | Johnson | 362/27 |
| 5,608,290 A * | 3/1997 | Hutchisson et al. | 362/327 |
| 6,547,423 B2 | 4/2003 | Marshall | |
| 6,679,621 B2 | 1/2004 | West | |
| 6,819,505 B1 | 11/2004 | Cassarly | |
| 6,880,945 B2 * | 4/2005 | Knaack et al. | 362/26 |
| 7,142,769 B2 * | 11/2006 | Hsieh et al. | 362/327 |
| 7,168,839 B2 * | 1/2007 | Chinniah et al. | 362/555 |
| 7,275,849 B2 | 10/2007 | Chinniah | |
| 7,329,029 B2 * | 2/2008 | Chaves et al. | 362/329 |
| 7,549,781 B2 * | 6/2009 | Kim et al. | 362/555 |
| 7,959,328 B2 * | 6/2011 | Wanninger | 362/309 |

FOREIGN PATENT DOCUMENTS

| | | |
|---|---|---|
| CN | 101220926 A | 7/2008 |
| EP | 0 945 673 A1 | 9/1999 |
| EP | 1 434 277 A1 | 6/2004 |
| EP | 1 895 228 A1 | 3/2008 |
| JP | 200921086 A | 1/2009 |

OTHER PUBLICATIONS

European patent application No. 10001363.0, European patent application filing date: Feb. 10, 2010, European Search Report mailing date: Jun. 14, 2010, 7 pages.

* cited by examiner

*Primary Examiner* — Alan Cariaso
(74) *Attorney, Agent, or Firm* — Winston Hsu; Scott Margo

(57) ABSTRACT

This invention discloses a light-emitting device. The light-emitting device includes a light-guiding member and an LED light source. The light-guiding member includes a reflection surface, a first refraction surface, and a second refraction surface. A first part of light emitted from the LED light source is reflected by the reflection surface and refracted by the first refraction surface to form a first virtual image in the light-guiding member. Moreover, a second part of light emitted from the LED light source is reflected by the reflection surface and refracted by the second refraction surface to form a second virtual image in the light-guiding member.

32 Claims, 2 Drawing Sheets

LIGHT-EMITTING DEVICE AND LIGHT-GUIDING MEMBER THEREOF

CROSS-REFERENCE TO RELATED APPLICATIONS

This Non-provisional application claims priority under 35 U.S.C. §119(a) on Patent Application No(s). 098104660 filed in Taiwan, Republic of China on Feb. 13, 2009, the entire contents of which are hereby incorporated by reference.

BACKGROUND OF THE INVENTION

1. Field of the Invention

The invention relates to a light-emitting device and, more particularly, to a light-emitting device having a light-guiding member for guiding light in forming a plurality of virtual images.

2. Description of the Related Art

The development of the light-emitting diode (LED) technology has already matured, and applications of the LEDs have been more and more popular. For example, the LED may be applied to illumination. Compared with a fluorescent lamp, the LED has lower power consumption and a long lifespan, and it does not have mercury. Therefore, the illumination equipment using the LED is power-saving and environment-friendly.

The LED has a luminous property, but only the front half part of the LED lights resulting from the manufacture and the packaging structure. If the LED is applied to be a light bulb, the luminous feature that only the front half part of the LED lights may limit the light bulb. The light bulb used the LED fails to achieve a full-circular luminous property of a conventional light bulb.

To achieve the full-circular luminous property, a conventional light-emitting device 1 using an LED as a light source has a base 10 having a plurality of surfaces. In FIG. 1, each surface is toward different directions. Further, a plurality of LEDs 12 are disposed at the surfaces of the base 10. However, the light-emitting device 1 needs to be bonded and assembled for many times, and the manufacture is complicated. In addition, the whole luminous effect fails to imitate a luminous effect of a filament of a conventional light bulb.

BRIEF SUMMARY OF THE INVENTION

According to one aspect of this invention, the invention provides a light-guiding member for guiding light emitted from a LED light source to define a plurality of virtual images, thereby imitating a luminous effect of a conventional light bulb.

In order to achieve the above aspect, the light-guiding member of the invention includes a reflection surface, a first refraction surface, and a second refraction surface. A first part of light emitted from the LED light source is reflected by the reflection surface and refracted by the first refraction surface to define a first virtual image in the light-guiding member, and a second part of light emitted from the LED light source is reflected by the reflection surface and refracted by the second refraction surface to define a second virtual image in the light-guiding member.

According to another aspect of the invention, the invention provides a light-emitting device allowing light emitted from an LED light source to define a plurality of virtual images, thereby imitating a luminous effect of a conventional light bulb.

In order to achieve the above aspect, the light-emitting device includes an LED light source and a light-guiding member. The structure of the light-guiding member and the directing path of the light emitted from the LED light source at the light-guiding member are described as the above.

In the embodiment of the invention, the light-guiding member guides the light emitted from the LED light source to define a plurality of virtual images through the combination of a plurality of reflection surfaces and refraction surfaces. A plurality of virtual images defined by the light guided by the light-guiding member are equal to virtual light sources located at different positions, vertical positions or horizontal positions for examples. The virtual light sources are not substantial. That is, there is no light blocking problem. Therefore, the light-emitting device of the invention can achieve the full-circular luminous effect. If the virtual light sources are located at the same optical axis, they are equal to linear light sources similar to filaments of a conventional light bulb for imitating the luminous effect of the conventional light bulb. Thereby, the light-emitting device in the invention not only has advantages of small volume and lower power consumption, but also can completely guide the light in emitting the light around thus to achieve the full-circular luminous effect.

These and other features, aspects, and advantages of the present invention will become better understood with regard to the following description, appended claims, and accompanying drawings.

DETAILED DESCRIPTION OF THE INVENTION

Some LEDs has a special package structure with an opening at one side and without an opening at the other side. Therefore, light emitted from the LED is only emitted from the side with the opening, i.e. the light is only emitted from one side. To make the light emitted from the LED which only emit light from one side achieve a lighting effect as multi light sources, a plurality of surfaces in the invention are used to reflect or refract the light, thus to gather and scatter the light to form a plurality of virtual light source. How a light-emitting device in the invention forms a plurality of virtual light sources to fully use the light and to imitate the luminous effect of a conventional light bulb is described hereinbelow.

Figure 1:
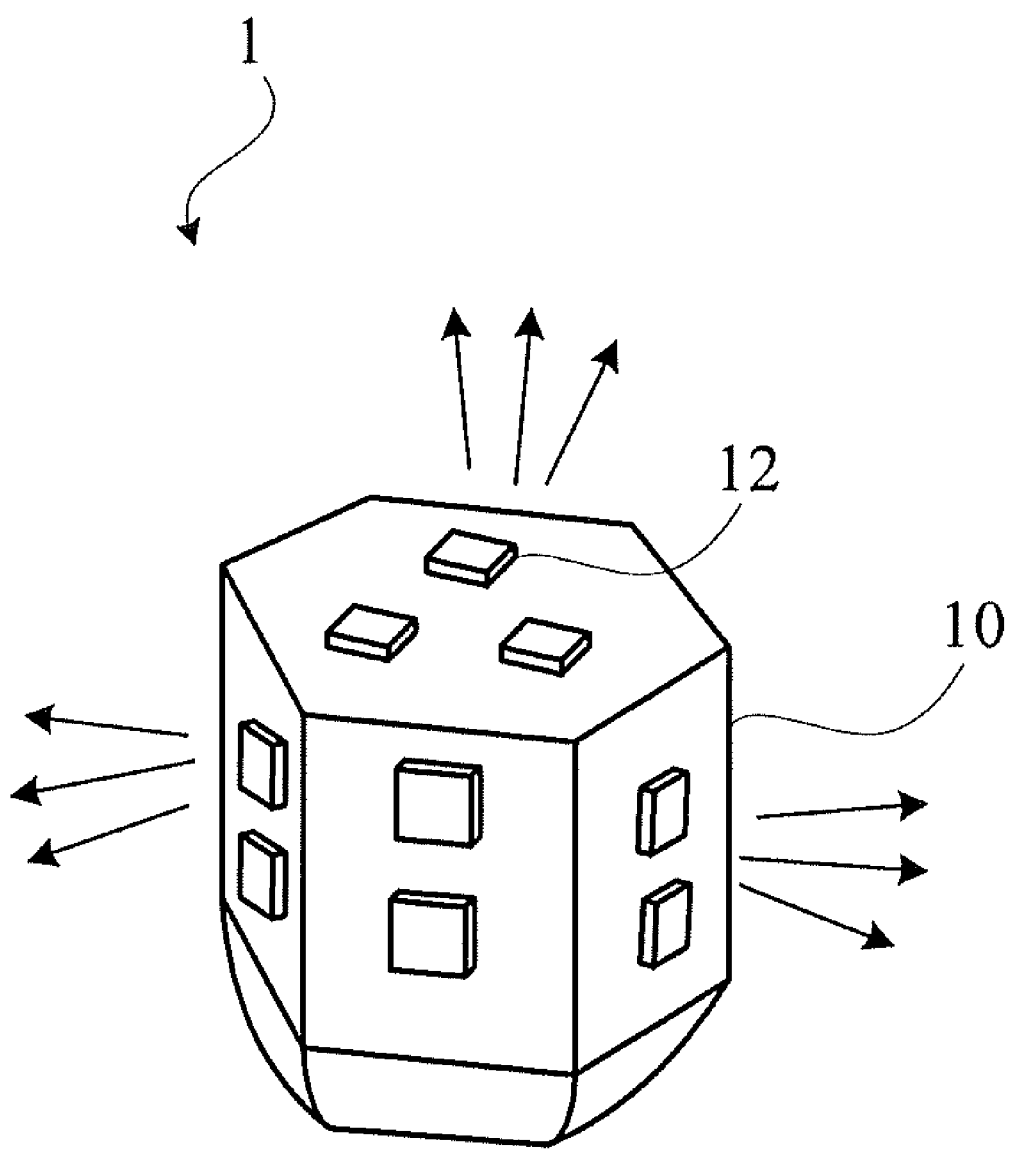
FIG. 1 is a schematic diagram of a conventional light-emitting device.
Figure 2:
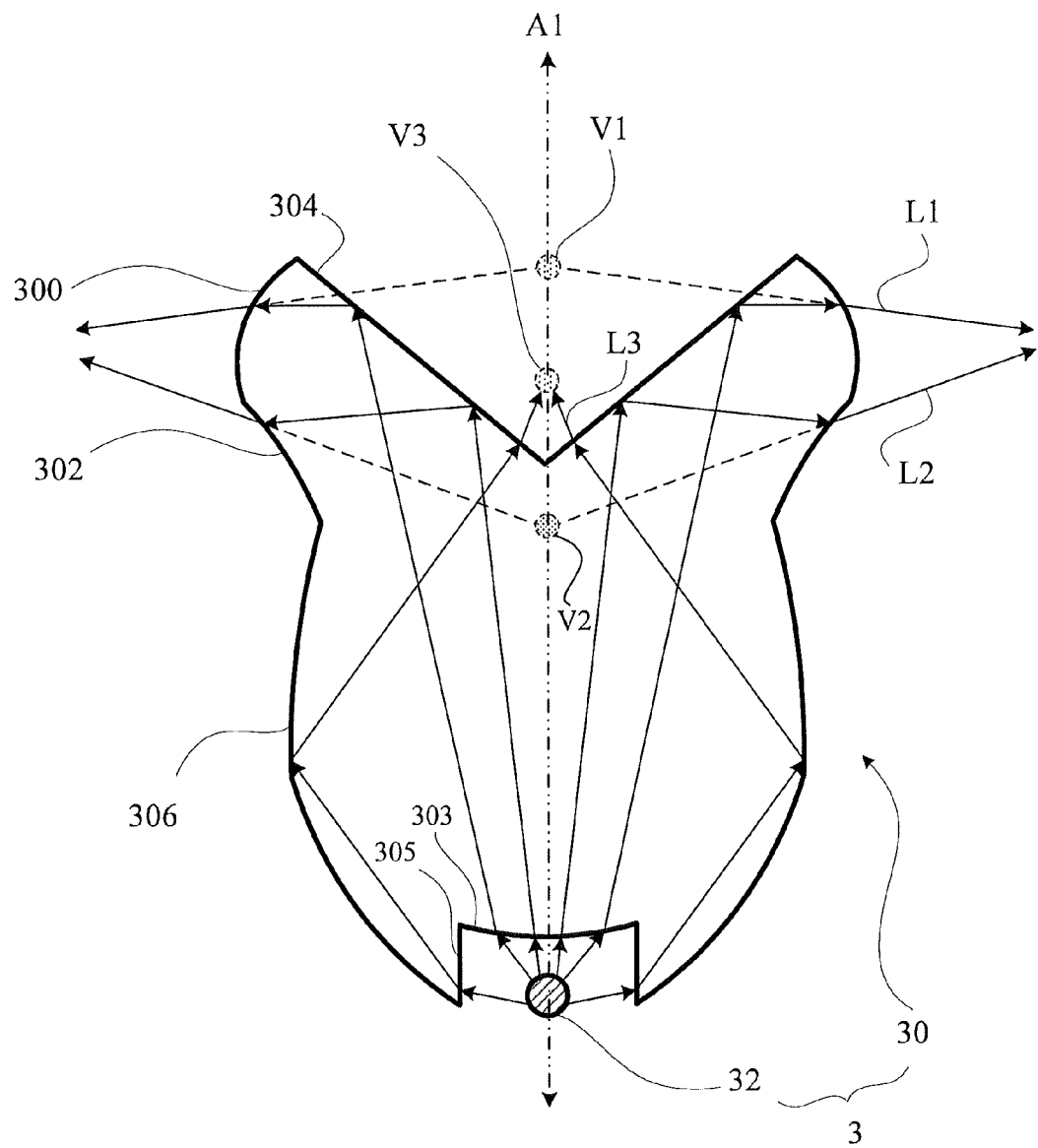
FIG. 2 is a schematic diagram of a light-emitting device according to an embodiment of the invention.

FIG. 2 is a schematic diagram of a light-emitting device 3 according to an embodiment of the invention. In FIG. 2, the light-emitting device 3 includes a light-guiding member 30 and a light-emitting diode (LED) 32. The light-guiding member 30 has two recessed spaces. One of the recessed spaces is designed to contain the LED 32, and the other one is designed to cooperate with an outside surface of the light-guiding member 30, thus to guide the light emitted from the LED 32 in forming a plurality of virtual images.

In a practical application, the LED 32 of the invention may be a single chip LED or a multi-chip LED. In addition, the LED 32 may be a white LED, a red LED, a green LED, a blue LED, a yellow LED, or an LED emitting the light with other colors. Moreover, when the LED 32 is a multi-chip LED, the LED chips emitting the light with different colors are selected to combine an LED emitting the light with an expected color.

Conventionally, the light-guiding member is designed to guide the light source in emitting the light at a specific angle.

For example, when the LED is used as a light source of a flashlight, lens equal to a light-guiding member may be disposed at the directing path of the LED to gather the light, thereby allowing the light emitted from the flashlight to be toward the same direction to gather the light effectively. However, the light-guiding member 30 in the embodiment of the invention is used to achieve the full-circular luminous effect. In other words, the light-emitting device 3 is not only used to gather the light emitted from the LED 32 but to make the light emitted from the LED 32 more evenly emitted around through the light-guiding member 30.

In FIG. 2, the light-guiding member 30 includes a first refraction surface 300 and a reflection surface 304. The first refraction surface 300 extends from the reflection surface 304. A space surrounded by the reflection surface 304 is one recessed space of the light-guiding member 30. The LED 32 is located in the recessed space, i.e. the containing space, surrounded by a first bottom surface 303 and a second bottom surface 305. A first part of light L1 emitted from the LED 32 is refracted by the first bottom surface 303 and incident on the reflection surface 304. When the first part of light L1 enters into the reflection surface 304, the first part of light L1 is reflected to the first refraction surface 300 by the reflection surface 304 since the reflection angle is greater than a total internal reflection critical angle. Finally, the first part of light L1 leaves the light-guiding member 30 after being refracted by the first refraction surface 300. A first virtual image V1 is formed at the intersection where the first part of light L1 leaving away from the light-guiding member 30 extend and intersect. The first part of light L1 leaving the light-guiding member 30 is equal to the light emitted from the first virtual image V1.

In FIG. 2, the light-guiding member 30 in the embodiment of the invention further includes a second refraction surface 302 extending from the first refraction surface 300. The first refraction surface 300 and the second refraction surface 302 have different curve radiuses. A second part of light L2 emitted from the LED 32 is refracted by the first bottom surface 303 and incident on the reflection surface 304. When the second part of light L2 enters into the reflection surface 304, the second part of light L2 is reflected to the second refraction surface 302 by the reflection surface 304 since the reflection angle is greater than a total internal reflection critical angle. Finally, the second part of light L2 leaves the light-guiding member 30 after being refracted by the second refraction surface 302. A second virtual image V2 is formed at the intersection where the second part of light L2 leaving away from the light-guiding member 30 extend and intersect. The second part of light L2 leaving the light-guiding member 30 is equal to the light emitted from the second virtual image V2.

In addition, the light path before the second part of light L2 enters into the second refraction surface 302 is similar to the light path before the first part of light L1 enters into the first refraction surface 300, but the curvature of the second refraction surface 302 is different from that of the first refraction surface 300. Therefore, the light path of the refraction light through the first refraction surface 300 is different from the light path of the refraction light through the second refraction surface 302, thereby forming virtual images at different positions, i.e. the second virtual image V2 is in the light-guiding member 30, and the first virtual image V1 is out of the light-guiding member 30. The light-guiding member 30 in the invention may have more refraction surfaces to guide the light in forming more virtual images at different positions to imitate the luminous effect of a conventional light source.

In addition, as shown in FIG. 2, the light-guiding member 30 in the embodiment of the invention includes a lower reflection surface 306 near the LED 32. A third part of light L3 emitted from the LED 32 is refracted by the second bottom surface 305 and then enters into the lower reflection surface 306. When the third part of light L3 enters into the lower reflection surface 306, the third part of light L3 is reflected to the reflection surface 304 by the lower reflection surface 306 since the reflection angle is greater than a total internal reflection critical angle. Since an incident angle formed by the third part of light L3 entering into the reflection surface 304 is smaller than a total internal reflection critical angle, instead of being reflected at the reflection surface 304, the third part of light L3 is refracted by the refection surface 304 and leaves the light-guiding member 30 to form a third virtual image V3. In the embodiment, the third part of light L3 is not scattered light but is focused in a space surrounded by the reflection surface 304. The third virtual image V3 is formed by true lights.

In a practical design, the reflection surface 304 and the lower reflection surface 306 may be coated with a reflecting material such as silver paint to ensure that the light is totally reflected. The third part of light L3 cannot pass through the reflection surface 304 coated with the reflecting material, thereby improving the whole luminous effect. Therefore, a designer can decide whether to coat the reflection surface 304 with the reflecting material according to the desired luminous effect and decide the coating area with the reflecting material.

As shown in FIG. 2, the light-guiding member 30 has a central axis A1. The reflection surface 304 and the central axis A1 form a bevel angle. Since the reflection surface 304, the first refraction surface 300, and the second refraction surface 302 are located symmetrically with respect to the central axis A1, the first virtual image V1, the second virtual image V2, and the third virtual image V3 are all formed at the central axis A1 according to the general optical theory. If the distance between the virtual images is little enough, the virtual images may be regarded as linear light sources, thereby imitating the luminous effect of a filament.

In order to achieve a different luminous effect of light-emitting device 3, the reflection surface 304, the first refraction surface 300, the second refraction surface 302, and the lower reflection surface 306 may be located asymmetrically with respect to the central axis A1. For example, the reflection surface may be divided into a left reflection surface and a right reflection surface according to the central axis. The angle between the left reflection surface and the central axis is different from the angle between the right reflection surface and the central axis. That is, a cross section of the reflection surface is asymmetrically V-shaped. Therefore, the position of the virtual image formed by the light reflected by the right reflection surface and refracted by the first refraction surface is different from the light of the other virtual image formed by the light reflected by the left reflection surface and refracted by the first refraction surface. In other words, the original first virtual image V1 is divided into two sub virtual images having different heights. Although the light intensity of each sub virtual image is weaker, more virtual sources is formed. In one word, the settings and the shape designs of the refraction surface and the reflection surface may be properly adjusted in the embodiment of the invention to achieve the desired luminous effect.

To sum up, in the invention, the reflection surface and the refraction surface of the light-guiding member 30 are not vertical to the light path. Therefore, the light emitted from the LED 32 cannot directly pass through the light-guiding member 30. However, the light is refracted and reflected for many times in the light-guiding member to form a plurality of different light paths, thereby forming a plurality of virtual light sources. The light-emitting device 3 in the invention may form a plurality of virtual light sources at the same optical axis via the single LED 32 and the light-guiding member 30. The luminous effect of the light-emitting device 3 may imitate the filament of the conventional light bulb. Therefore, the power consumption of the light-emitting device 3 is lower than that of the conventional light bulb. Moreover, the manufacture of the light-emitting device 3 is simpler than that of a light bulb having a plurality of LEDs.

Compared with the conventional art, the light-guiding member in the invention guides the light emitted from the LED light source in forming a plurality of virtual images by the combination of the reflection surfaces and the refraction surfaces. A plurality of virtual images formed by the light guided by the light-guiding member are equal to virtual light sources located at different positions, e.g. vertical positions or horizontal positions. These virtual light sources are not solid structure, and have no problem of stopping the light. Therefore, the light-emitting device of the invention may achieve the full-circular luminous effect. If the virtual light sources are located at the same optical axis, they are equal to the linear light sources, similar to filaments of a conventional light bulb, thus imitating the luminous effect of the conventional light bulb. The light-emitting device in the invention not only is of small volume and lower power consumption of LEDs, but also completely guide the light in emitting the light around to achieve the full-circular luminous effect.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A light-guiding member, applied to an LED light source, comprising:
   a reflection surface;
   a first refraction surface; and
   a second refraction surface,
   wherein a first part of light emitted from the LED light source is reflected by the reflection surface and refracted by the first refraction surface to form a first virtual image out of the light-guiding member, and a second part of light emitted from the LED light source is reflected by the reflection surface and refracted by the second refraction surface to form a second virtual image in the light-guiding member;
   wherein the first refraction surface is a curved surface with a first curve radius, and the second refraction surface is a curved surface with a second curve radius.

2. The light-guiding member according to claim 1, further comprising a containing space for containing the LED light source.

3. The light-guiding member according to claim 1, wherein the light-guiding member has a central axis.

4. The light-guiding member according to claim 3, wherein the reflection surface and the central axis form a bevel angle.

5. The light-guiding member according to claim 3, wherein the first refraction surface is located around the central axis.

6. The light-guiding member according to claim 3, wherein the second refraction surface is located around the central axis.

7. The light-guiding member according to claim 3, wherein the reflection surface, the first refraction surface, and the second refraction surface are located asymmetrically with respect to the central axis.

8. The light-guiding member according to claim 3, wherein the reflection surface is divided into a left reflection surface and a right reflection surface according to the central axis, and the angle between the left reflection surface and the central axis is different from the angle between the right reflection surface and the central axis.

9. The light-guiding member according to claim 3, wherein the first virtual image is formed at the central axis.

10. The light-guiding member according to claim 3, wherein the second virtual image is formed at the central axis.

11. The light-guiding member according to claim 1, wherein the first refraction surface and the second refraction surface have different curve radiuses.

12. The light-guiding member according to claim 1, wherein the first refraction surface extends from the reflection surface.

13. The light-guiding member according to claim 1, wherein the second refraction surface extends from the first refraction surface.

14. The light-guiding member according to claim 1, further comprising a lower reflection surface, a third part of light emitted from the LED light source being reflected by the lower reflection surface and passing through the reflection surface of claim 1 to form a third virtual image in the light-guiding member.

15. The light-guiding member according to claim 1, wherein the LED light source is a single chip LED light source or a multi-chip LED light source.

16. The light-guiding member according to claim 1, wherein the LED light source is a red LED light source, a green LED light source, or a blue LED light source.

17. A light-emitting device comprising:
    an LED light source; and
    a light-guiding member, including:
       a reflection surface;
       a first refraction surface; and
       a second refraction surface,
    wherein a first part of light emitted from the LED light source is reflected by the reflection surface and refracted by the first refraction surface to form a first virtual image out of the light-guiding member, and a second part of light emitted from the LED light source is reflected by the reflection surface and refracted by the second refraction surface to form a second virtual image in the light-guiding member;
    wherein the first refraction surface is a curved surface with a first curve radius, and the second refraction surface is a curved surface with a second curve radius.

18. The light-emitting device according to claim 17, wherein the light-guiding member further comprises a containing space for containing the LED light source.

19. The light-emitting device according to claim 17, wherein the light-guiding member has a central axis.

20. The light-emitting device according to claim 19, wherein the reflection surface and the central axis form a bevel angle.

21. The light-emitting device according to claim 19, wherein the first refraction surface is located around the central axis.

22. The light-emitting device according to claim 19, wherein the second refraction surface is located around the central axis.

23. The light-emitting device according to claim 19, wherein the reflection surface, the first refraction surface and the second refraction surface are located asymmetrically with respect to the central axis.

24. The light-emitting device according to claim 19, wherein the reflection surface is divided into a left reflection surface and a right reflection surface according to the central axis, and the angle between the left reflection surface and the central axis is different from the angle between the right reflection surface and the central axis.

25. The light-emitting device according to claim 19, wherein the first virtual image is formed at the central axis.

26. The light-emitting device according to claim 19, wherein the second virtual image is formed at the central axis.

27. The light-emitting device according to claim 17, wherein the first refraction surface and the second refraction surface have different curve radiuses.

28. The light-emitting device according to claim 17, wherein the first refraction surface extends from the reflection surface.

29. The light-emitting device according to claim 17, wherein the second refraction surface extends from the first refraction surface.

30. The light-emitting device according to claim 17, wherein the light-guiding member further comprises a lower reflection surface, and a third part of light from the LED light source is reflected by the lower reflection surface and passes through the reflection surface of claim 17 to form a third virtual image before leaving the light-guiding member.

31. The light-emitting device according to claim 17, wherein the LED light source is a single chip LED light source or a multi-chip LED light source.

32. The light-emitting device according to claim 17, wherein the LED light source is a red LED light source, a green LED light source, or a blue LED light source.

* * * * *